US006377041B1

(12) United States Patent
Jones, Jr. et al.

(10) Patent No.: US 6,377,041 B1
(45) Date of Patent: Apr. 23, 2002

(54) METHOD AND APPARATUS FOR DETERMINING ELECTROMAGNETIC FIELD CHARACTERISTICS WITHIN A VOLUME

(75) Inventors: Herbert R. Jones, Jr., Williston; Igor Khalfin, South Burlington, both of VT (US)

(73) Assignee: Polhemus Inc., Colchester, VT (US)

( * ) Notice: Subject to any disclaimer, the term of this patent is extended or adjusted under 35 U.S.C. 154(b) by 0 days.

(21) Appl. No.: 09/215,052

(22) Filed: Dec. 17, 1998

(51) Int. Cl.$^7$ .......................... G01R 33/02; G01P 21/00
(52) U.S. Cl. ..................... 324/244; 324/207.12; 702/94
(58) Field of Search ................ 324/244, 247, 324/225, 207.12; 702/85, 94, 95, 104, 150, 152, 153; 342/450, 457

(56) References Cited

U.S. PATENT DOCUMENTS

| | | | |
|---|---|---|---|
| 4,287,809 A | 9/1981 | Egli et al. | 89/41 |
| 4,314,251 A | 2/1982 | Raab | 343/112 R |
| 4,394,831 A | 7/1983 | Egli et al. | 89/41 |
| 4,737,794 A | 4/1988 | Jones | 342/448 |
| 4,807,637 A | 2/1989 | Bjorkholm | 128/664 |
| 5,137,355 A | 8/1992 | Barbour et al. | 356/342 |
| 5,453,686 A | 9/1995 | Anderson | 324/207.17 |
| 5,644,229 A | 7/1997 | Dössel et al. | 324/247 |

OTHER PUBLICATIONS

J. Wu; "Convolution picture of the boundary conditions in photon migration and its implications in time–resolved optical imaging of biological tissues," J. Opt. Soc. Am. A, vol. 14, No. 1, Jan. 1977 pp. 280–287.

A. Figotin, I. Khalfin; "Bound States of a One–Band Model for 3D Periodic Medium," Journal of Computational Physics, 138, 1997, pp. 153–170.

S. Colak, D. Papaioannou, G. t'Hooft, M. van der Mark, H. Schomberg, J. Paasschens, J. Melissen, N. van Asten; "Tomographic image reconstruction from optical projections in light–diffusing media," Applied Optics, vol. 36, No. 1, Jan. 1997, pp. 180–213.

I. Khalfin, "Inverse problem stymies optical tomography," Laser Focus World, Jan. 1998, pp. 179–188.

H. Jiang, K. Paulsen, U. Osterberg, "Simultaneous reconstruction of optical absorption and scattering maps in turbid media from near–infrared frequency–domain data," Optics Letters, vol. 20, No. 20, Oct. 15, 1995, pp. 2128–2130.

*Primary Examiner*—Walter E. Snow
(74) *Attorney, Agent, or Firm*—Gifford, Krass, Groh, Srinkle, Anderson & Citkowski, PC (57) ABSTRACT

Electromagnetic field mapping is accelerated by acquiring data from the surface bounding a volume of interest and solving the boundary value problem (BVP) using Green's function in a preferred embodiment. Instead of measuring electromagnetic field components on a step-by-step basis at each point within a region of interest, only a component of the field, preferably the normal component, is measured on the surface bounding the volume. The use of surface data acquisition, a solution to the BVP using Green's function, and optional error correction based on the treatment of errors as virtual sources, combine to produce a process of defining of the electromagnetic field within the volume that reduces to a few minutes what presently takes days or longer, and sometimes impossible. Data acquisition may be carried out either by moving sensors along the surface or, preferably, by fixing the position of several single axis or one-directional sensors on the surface bounding the volume without the necessity of moving parts. All geometry-dependent parameters, as determined by the shape and size of the volume of interest, may be pre-computed or computed independently on measurements. In addition to electromagnetic tracking systems, including LOS tracking, the methodology is directly applicable to electromagnetic motion capture systems, tomographic systems and devices (including optical, X-ray, magnetic), non-destructive electromagnetic measurements, and remote sensing.

40 Claims, 6 Drawing Sheets

METHOD AND APPARATUS FOR DETERMINING ELECTROMAGNETIC FIELD CHARACTERISTICS WITHIN A VOLUME

FIELD OF THE INVENTION

This invention relates generally to the determination of electromagnetic field characteristics and, in particular, to the determination of the electromagnetic field within a volume.

BACKGROUND OF THE INVENTION

There are many problems in sensing and imaging which would benefit from a precise knowledge of the electromagnetic field at different points within a region or volume of interest. Examples include electromagnetic tracking, tomography, and remote sensing.

Existing methods of obtaining information about the electromagnetic field in a bulk/bounded volume are either slow, inaccurate, or restricted in terms of application. U.S. Pat. Nos. 4,737,794 to Jones; 4,314,251 to Raab; 4,394,831 and 4,287,809, both to Egli; 5,453,686 and European Patent Application No. 96304154, both to Anderson, each concern methods of measuring electromagnetic position and orientation in an aircraft cockpit, room in a building or other bounded volume. Implementation of these methods and, in particular, compensation for the distortion which arises, requires a definition of the field by moving sensors between discrete points in the volume. The methods are generally slow since the number of acquisition points is large. Also, all three components of the vector of magnetic induction are measured at each point, requiring precise mechanical equipment.

Other methods are restricted by application to optical/X-ray measurements in scattering media, or the methods are incomplete in that they are unable to restore/compute an accurate map of the electromagnetic field within a volume, including both the vector of magnetic induction and scalar potential. The method of U.S. Pat. No. 5,137,355 to Barbour et al., for example, involves computations of contributions of modeled scattered quasi-particles in the bulk, which are correlated to the flux intensity on the surface. The method is limited to infrared band and collimated measurements at discrete points using collimated sources or plurality of points of field illumination/irradiation.

The method of Huabei Jiang et al, Opt. Lett. 21, No. 20, employs measurement of the transmission of photon density waves (i.e., a modulated light beam). The number of illumination points is comparable with the number of sensors and computations of propagation matrix are iterative. The method of Jun Wu, J. Opt. Soc. Am. A14, No. 1 is based on a photon propagation in semi-infinite space medium with a single boundary based upon a step-like treatment of the properties of the medium on the boundary. The method of S. B. Colak et al,. Appl. Opt. 36, No. 1 is similar to that of Jun Wu, above, but uses a continuous-wave (CW) signal, and restores an intensity map with an empiric de-blurring function.

One application of electromagnetic position and orientation tracking is line-of-sight (LOS) tracking, which involves the measurement of a pilot's look angle, as discussed in the patents to Jones and Egli referenced above. LOS trackers measure the position and orientation of sensing antennas relative to respective transmitting antennas. The technology is based on the generation and detection of AC electromagnetic fields, using a computer to calculate relative position and orientation from the sensed data using knowledge of field strength and direction throughout the environment.

Figure 1:
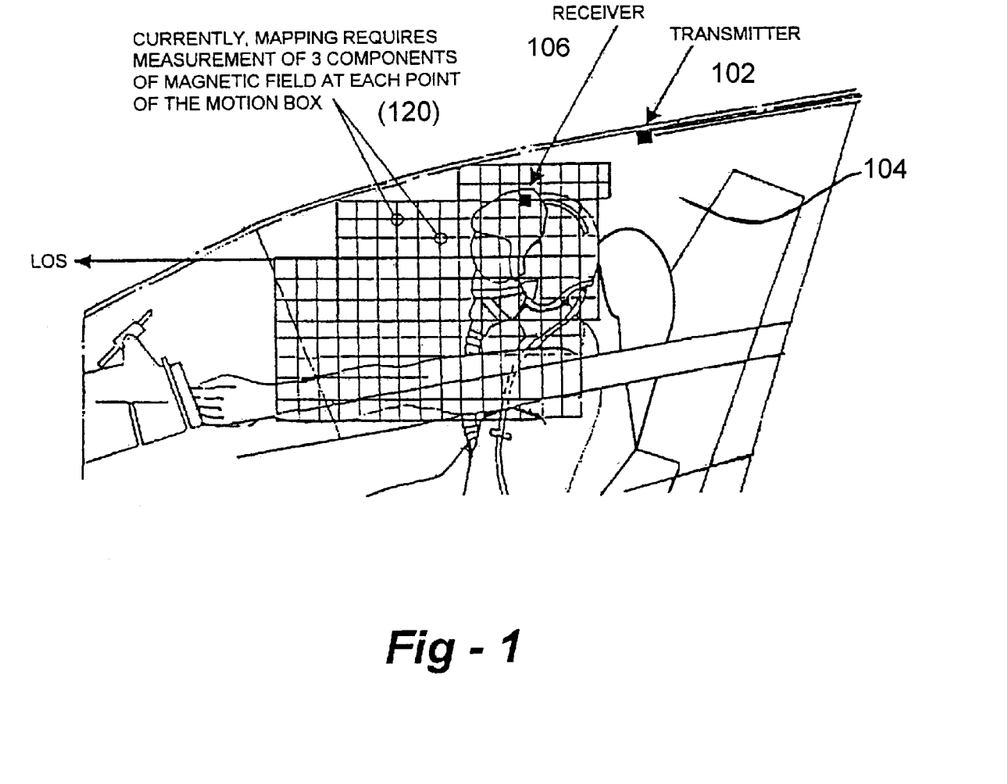
FIG. 1 illustrates a cockpit environment wherein current mapping technology is used to measure three components of the magnetic field at each point within a motion box as part of a line-of-sight (LOS) tracking system setup.

Making reference to FIG. 1, the tracker's transmitting antenna 102 floods the cockpit 104 with magnetic fields, and the signals sensed by helmet-mounted sensing antennas 106 are fed to an on-board computer where the sensor's coordinates are calculated. Tracker transmitting and sensing antennas 102 and 104 each consist of three orthogonal coils of wire wound on a common bobbin, enabling the antennas to sense all three components of the electromagnetic field vector.

A difficulty with this technology is that AC electromagnetic fields induce eddy currents in conductors, of which there are many in a cockpit and other environments in which such systems are used. The induced currents in turn radiate magnetic fields that interfere or distort the intended fields, and ultimately cause errors in sensor coordinate calculations.

A precise determination or "mapping" of the electromagnetic field is therefore employed to measure field strength and/or direction within the volume prior to use of the tracking system. Such a process defines characteristics of the electromagnetic field inside the volume to create a map or a data table of these characteristics corresponding to the entire volume of interest. Measurements are traditionally performed using a precision fixture which translates mapping sensors to thousands of points 120 in the volume, as shown in FIG. 1. The electromagnetic field data collected during the mapping procedure are entered into the on-board computer, which uses it as a basis for sensor position and orientation computations. Changes to the environment mandate re-mapping of the volume.

A typical mapping fixture based upon existing technology may include: a) three-axis motors, precision drive screws, and carefully aligned three-axis mapping sensors; b) parts that have to be dismantled and reassembled in various configurations to reach all points of interest and to align the fixture; c) motor control electronics; and d) a computer with application software to control the movement of the mapper.

The process of using this type of fixture is tedious, prone to failure and error, and excessively time consuming. Excluding time for fixture installation and alignment, a typical procedure of this kind may take several days to two weeks per aircraft, and requires one or two qualified persons and about 600 pounds of equipment. Since a map of one aircraft cannot be applied accurately to another aircraft, the procedure must be repeated for every aircraft.

Other area of application of this invention are remote sensing and non-destructive measurements (see FIGS. 2 and 3), i.e., situations when points inside the volume of interest are inaccessible.

SUMMARY OF THE INVENTION

This invention enables the process of fast mapping (or defining characteristics within the volume) of the electromagnetic field by acquiring data from the surface bounding a volume of interest and solving the boundary value problem (BVP). Broadly, instead of measuring a plurality of the electromagnetic field components on a step-by-step basis at each point within a region of interest, only a single component of the field is measured on the surface bounding the region. In a preferred embodiment, the normal component of the electromagnetic induction or the normal to the surface derivative of the scalar potential is the measured quantity.

Since the amount of data to be collected is relatively small (one component at the surface instead of three components in an entire volume) and data acquisition does not require moving parts, the data can be collected in a very short time as compared to existing techniques. The acquired data forms the input to the boundary value problem, and the solution is, in fact, the scalar potential (or electromagnetic induction, or flux) of the electromagnetic field in the bulk.

In a preferred embodiment the solution to the BVP is based upon using Green's functions, which can be computed independently and before data acquisition begins using knowledge of the physical process of propagation of the electromagnetic waves and geometry of the volume of interest. The necessary computations of Green's functions or weight functions may take from minutes to days on existing computer hardware (depending on available hardware and required accuracy), but it only needs to be computed once for a given geometry and physical process, and the result does not depend on acquired data. Following this initial computation the functions may be applied repeatedly to new mapping data in a very direct and straightforward manner, taking from milliseconds to, at most, a few minutes to complete the solution (depending on required accuracy). As such, a single fixture may be used to map different types of environments, depending upon the application.

Another feature of the disclosed method is its ability to correct errors due to discretization, noise, truncation, or other numerical causes. The errors are detected, and then fed back into the process by treating the errors at each computed point as virtual sources of the electromagnetic field, then subtracting their contributions from the solution. Conveniently, the error reduction algorithm uses the same pre-computed Green's functions.

These three important aspects of the invention, namely, surface single component data acquisition, the Green's function based BVP solution, and error correction employing the treatment of errors as virtual sources, combine to produce a process of determining electromagnetic fields inside a volume that reduces to a few minutes what presently takes days to complete, or sometimes impossible. Data acquisition may be carried out either by moving sensors along the surface or, preferably, by fixing the position of several single axis or one-directional sensors on the surface bounding the volume. The latter does not require moving parts.

Figure 2:
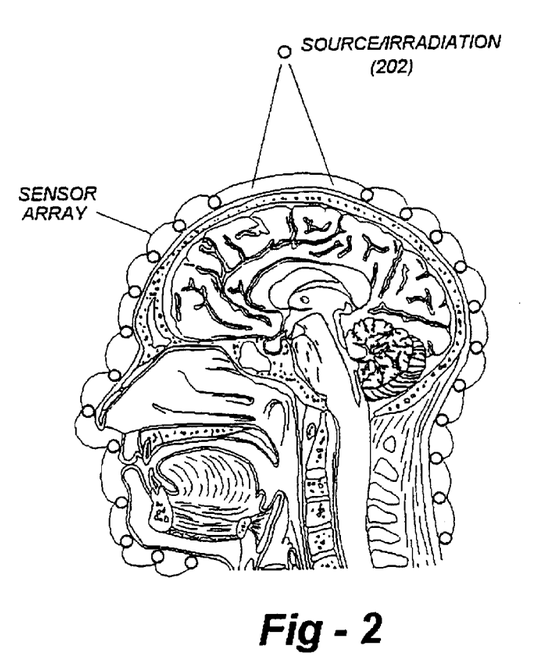
FIG. 2 is a side-view drawing in cross-section illustrating how the invention may be applied to optical or computer-aided tomography in biology and medicine.
Figure 3:
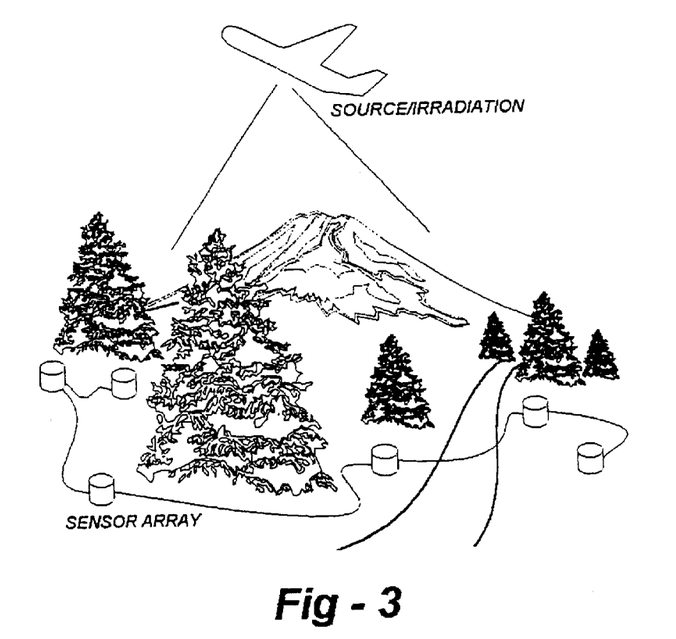
FIG. 3 is a drawing, as seen from an oblique perspective, which shows how the invention may be applied to geophysical applications, including airborne remote sensing. Sensors may be on the aircraft and data will be acquired sequentially, source may be on the ground, on another aircraft or satellite.

The technique is capable of determining different characteristics of the field such as the intensity of flux, scalar potential, or electromagnetic induction. The invention is applicable to numerous commercial products which would benefit from the mapping or definition of an electromagnetic field in a bounded volume. The invention is further applicable to situations when points inside the volume of interest are inaccessible, since the approach allows determining characteristics of t he electromagnetic field inside this volume by acquiring only the surface data. In addition to electromagnetic tracking systems such as LOS tracking, the methodology is directly applicable to electromagnetic motion capture systems, tomographic systems and devices (including optical, X-ray, magnetic), non-destructive electromagnetic measurements, and remote sensing (FIGS. 1–3).

BRIEF DESCRIPTION OF THE DRAWINGS

All positions are relative to the tracker source coils.

DETAILED DESCRIPTION OF THE INVENTION

This invention resides in surface data acquisition, the solving of a boundary-value problem (BVP) and, optionally, in compensating for computational errors. The disclosed method is to be distinguished from volume mapping, since the disclosed method produces information about interior points never physically visited or measured.

The particular BVP of interest herein is the closed-surface von Neumann type. Neumann BVP theory is widely discussed in mathematics, engineering and physics textbooks, and there exist several approaches to solving this particular problem. One numerical approach involves polynomial regression; another approach solves the interaction of thousands of numerical cells that comprise the volume. These and other methods all require mapping data at the onset of the problem solving session. Thus, each separate mapping session involves the definition of an entirely different BVP and a new solution therefor. These solutions are by no means trivial, however, and can take several hours or even days on existing high-performance computers.

In a preferred embodiment, the invention employs a Green's function approach to the solution of a Neumann BVP. Importantly, since the physical law describing the electromagnetic field and geometry of the problem have been defined, Green's functions can be computed before a mapping session even begins, or at least independently of the mapping session. The computed Green's functions do not depend on particular data set. The necessary computation may also take from hours to days, but it only needs to be computed once for a given geometry. After that, the functions may be applied again and again to new mapping data in a very direct and straightforward manner, taking seconds or, at most, a few minutes to complete the solution. As such, a single fixture may be used to map thousands of different types of environments, depending upon the application.

Another feature of the disclosed method is its ability to correct errors due to discretization, truncation, noise, or other numerical causes. The errors are detected, and then fed back into the process by treating the errors at each computed point as virtual sources of the electromagnetic field, then subtracting their contributions from the solution. The error reduction algorithm uses the same pre-computed Green's functions.

These three important aspects of the invention, namely, surface mapping, the Green's function BVP solution, and error correction based on the treatment of errors as virtual sources, combine to produce a mapping process (defining of the electromagnetic field within the volume) that reduces to a few minutes what presently takes days, or sometimes simply impossible. In addition, the process is stable with respect to any zero-mean noise in sensor data.

The method does not require measurement of all components of the electromagnetic field in the bulk. Rather, the preferred method requires only measurement of one component of the field, in particular the component normal to the surface, at discrete points on the surface bounding the mapped volume. The measuring fixture is preferably a hollow box or frame with single axis or one-directional sensors placed preferably regularly on the surface. A single sensor, or group of sensors scanning the surface, or any combination of these, may be used.

At each of the surface points, only the normal components of the electromagnetic field (e.g., normal to the surface derivative of potential/normal component of magnetic induction or intensity) are measured. The measured data are input to a computer program that numerically/analytically solves the boundary value problem in the form: Given normal derivatives of the flux/field on the surface of known geometry with known positions of sensors on this surface; Find: the flux/field inside the volume that is bounded by the surface.

Figure 4:
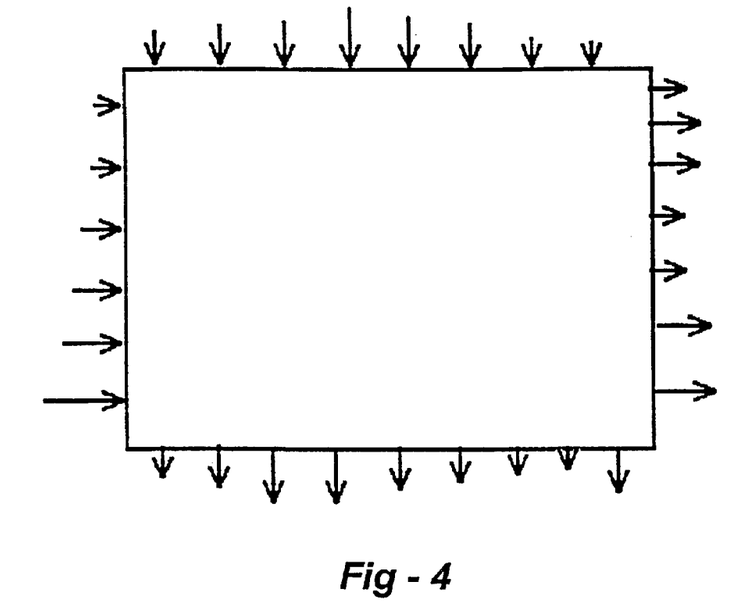
FIG. 4 is a schematic drawing which helps to illustrate how a Neumann boundary value problem may be used to establish the relationship between the normal derivative of the field (flux) on a surface and the field within the volume defined thereby.

This problem, depicted schematically in FIG. 4, is solved for the field described by the differential equation (e.g., Poisson, Laplace, Helmholtz, Schrödinger) having the general form:

$$\Im \Phi(r) = 0 \qquad (1)$$

where $\Im$ is the differential operator corresponding to the equation describing the field, and $\Phi$ is the spatially dependent characteristic of the field to be found (e.g., scalar potential).

Some of the above mentioned examples are:

i) Poisson equation:

$$\nabla^2 \Phi(r) - p(r) = 0; \qquad (2)$$

ii) Schrödinger equation:

$$-\nabla^2 \Phi(r) + U(r)\Phi(r) = 0; \text{ and} \qquad (3)$$

iii) Helmholtz equation:

$$\nabla^2 \Phi(r) + k^2 \Phi(r) = 0. \qquad (4)$$

The solution, $\Phi(r)$, at any point r in the volume in the absence of sources of the electromagnetic field inside the volume of interest (the case of the Laplace equation) is represented in the form:

$$\Phi(r) = -\sum_{r'} G(r - r') \frac{\partial \Phi(r')}{\partial \bar{n}} \delta S \qquad (5)$$

Points r' correspond to the sensors on the bounding surface {S}, and surface elements δS correspond to the area covered by each sensor.

This expression treats the solution as a sum of contributions of surface elements to the field in the volume. Values $\partial \Phi / \partial n$ are acquired from the surface sensors. Weight functions G(r–r'), which are the Green's functions of the differential operator $\Im$, are independent of measurements and are preferably pre-computed for the given geometry of the measuring fixture. The presence of sources adds to the solution term as:

$$\delta \Phi(r) = \int_v G(r - r'') p(r'') d^3 r'', \qquad (6)$$

where p(r") is a spatially distributed source function within the volume V.

Errors due to noise, mechanical irregularities, discretization and numerical computation may be corrected as follows: Let $\Phi$ be the actual value of the function to be found, and $\Phi^*$ is the computed value. The error occurring in the basic equation is:

$$\Im \Phi(r) = \epsilon. \qquad (7)$$

This error behaves physically as a virtual source, so:

$$\Im [\Phi(r) - \Phi^*(r)] = -\epsilon. \qquad (8)$$

As a result, the corrected potential will be:

$$\Phi(r) = \Phi*(r) - \sum_{r'} \epsilon(r') G(r - r'). \qquad (9)$$

This error compensation procedure may be repeated iteratively (depending on required accuracy).

The method of the invention completely determines the electromagnetic field in the volume of interest with controlled accuracy, and with a minimal set of measurements. Instead of measuring all magnetic field components step-by-step at each point of the motion box or of the volume of interest the method requires measuring only the normal to the surface derivative of potential (or normal component of magnetic induction) on the surface bounding the volume. Since the amount of data to be collected is small (one component at the surface instead of three components in a whole volume), this data can be collected in a very short time with fixed arrays of single coil sensors on the plane. Collected data is input for the solution of the boundary value problem, and the solution, in fact, is the scalar magnetic potential (or magnetic induction, or intensity, or flux) of the electromagnetic field in the bulk. An important step is a solution to the boundary value problem which may be evaluated in a short time.

Solving the Boundary Value Problem

As discussed above, the boundary value problem (von Neumann) may be formulated as follows: Given the normal derivatives of the flux/field on the surface of a region of interest. Find the flux/field inside the region without having to perform any measurements in the bulk. There are known methods of the solution, including i) polynomial regression; ii) over-relaxation; and iii) Fourier expansion and inverse FFT. The disadvantages of these methods are that they are iterative, their convergence depends on the input data, and they can yield an oscillating solution. In the preferred embodiment it was therefore decided to use Green's functions method, well known to modern theoretical physics which allows a user to find a general solution a priori.

As one example of many, applicable to the aircraft cockpit mapping and line-of sight (LOS) tracking systems, we solve the problem for the scalar potential $\Phi$, which allows us to define the electromagnetic induction B in the absence of current, as: B=-grad $\Phi$. The equation for the scalar potential is:

$$\nabla^2 \Phi(r) = 0 \tag{10}$$

The closest analogies of this equation, as it has been mentioned above, can be treated in a similar manner.

Since, mathematically, Green's function is defined as a kernel of resolvent of differential operator, for the Laplacian it satisfies the following relations:

$$\nabla^2(r-r') = \delta(r-r') \tag{11}$$

$$G(r-r') = G(r-r') \tag{12}$$

The solution for the Poisson equation (note that Laplace equation is the particular case of this equation) is:

$$\Phi(r) = \int_v G(r-r') p(r') d^3 r' \tag{13}$$

Recalling Green's theorems:

$$1) \ \frac{\partial g}{\partial \bar{n}} = \nabla g \cdot \bar{n}; \tag{14}$$

$$2) \ \int_v (f \nabla^2 g - g \nabla^2 f) dV = \int_S \left( f \frac{\partial g}{\partial \bar{n}} - g \frac{\partial f}{\partial \bar{n}} \right) dS; \tag{15}$$

and substituting equalities for the Green's function, we get, for the Neumann boundary conditions with the absence of source terms in the volume bounded by the surface $\{S\}$:

$$\Phi(r) = \int_S \left( \Phi(r') \frac{\partial G(r-r')}{\partial \bar{n}} - G(r-r') \frac{\partial \Phi(r')}{\partial \bar{n}} \right) dS \tag{16}$$

$$= -\int_S G(r-r') \frac{\partial \Phi(r')}{\partial \bar{n}} dS$$

This expression, with the integral in the right hand side, replaced by the sum is the final formula to determine the scalar potential at any given point r in the volume bounded by the surface $\{S\}$, and this equation is exactly the same as in the previous section. Green's functions G(r-r') are independent of acquired field data and may be pre-computed for the given shape of the mapping fixture, with values of $\partial \Phi/\partial n$ being acquired from the surface of this motion box.

Green's functions are preferably computed using the method described in the article by I. Khalfin, entitled Inverse Problem Stymies Optical Tomography, Laser Focus World, January, 179, (1998); and A. Figotin, I. Khalfin, Bound States of One-Band Model for 3D Periodic Medium, Journ. of Comput. Phys 138, 153, (1997). This approach employs treatment of Green's function between two points as a probability to reach one point moving from another via all possible routes on the grid including loops and allows to compute functions with predicted accuracy.

Sources of Errors, and Error Correction

As with any combination of physical measurements and numerics, the process described herein introduces errors to the result. Sources of these errors are: i) discretization (i.e., finite number of sensors); ii) the finite accuracy of Green's functions evaluation; and iii) noise and mechanical irregularity. As a part of the invention, the following methods of error correction has been developed and implemented as a subroutine.

Let $\Phi$ be the actual value of potential to be found, and $\Phi^*$ is the computed value. The error occurring in the basic equation is:

$$\nabla^2 \Phi^* = \epsilon \tag{17}$$

since $\nabla^2 \Phi = 0$.

This error behaves physically as a virtual source (compared with the Poisson equation). Thus:

$$\nabla^2(\Phi - \Phi^*) = -\epsilon, \tag{18}$$

and, in turn:

$$\sum_{r'} [\nabla 2(\Phi(r) - \Phi*(r))G(r-r')] = -\sum_{r'} \epsilon(r) G(r-r'). \tag{19}$$

As a result, the corrected potential will be:

$$\Phi(r) = \Phi*(r) - \sum_{r'} \epsilon(r') G(r-r'). \tag{20}$$

Note that functions G(r-r') are pre-computed, and that correction may be repeated few times.

Figure 5:
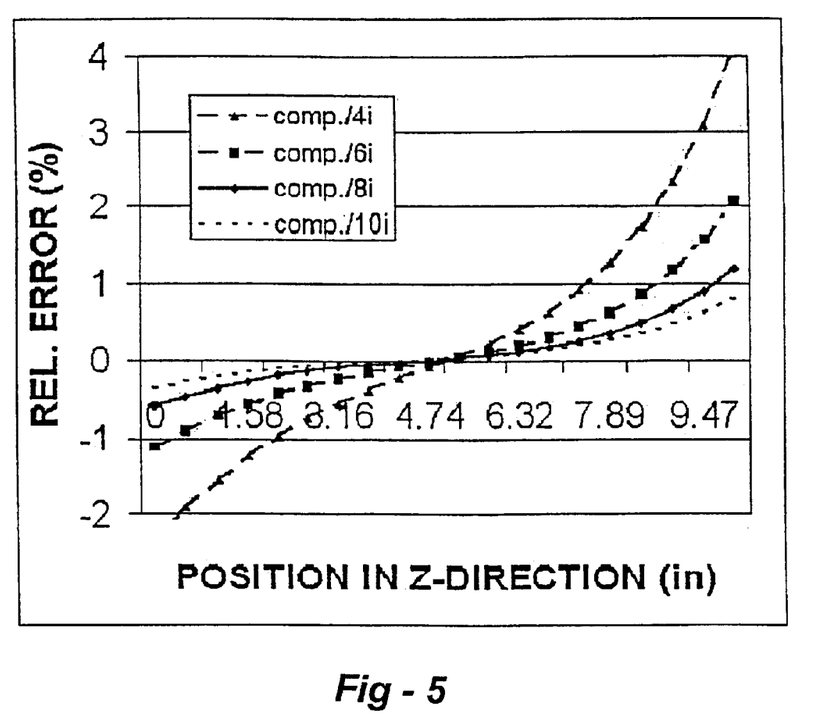
FIG. 5 is a chart presenting the results of error correction steps for the relative error of the scalar potential compared with actual data for a 12×10×10 inch parallelepiped using a grid size of 20×20×20.

Results of numerical tests of the error correction method are presented in FIG. 5. These results have been obtained with accuracy in evaluating Green's functions of about two percent at the point (0,0,0) and about 50 percent at the point (10,10,10). It is clear that higher accuracy of Green's function evaluation decreases the required number of error correction steps, and in the case of mathematically exact computations of these functions, one need only perform a single step.

Density of Points—Interpolation

Since discrete and finite numbers of sensors/detectors on the surface is one of the sources of computational errors, one can decrease this error and increase spatial resolution by increasing the density of points. On the other hand, regular spacing of sensors or points of measurements on the surface is not always achievable. An increase in the density of points and regularization can be done by interpolating the sensor readings on the surface. This will result in both higher accuracy and denser points in the bulk. A numerical experiment has been performed to compare the potential evaluated from real data with the potential evaluated from interpolated surface data, doubling the number of sensors in the row with linear interpolation (see FIG. 6).

Figure 6:
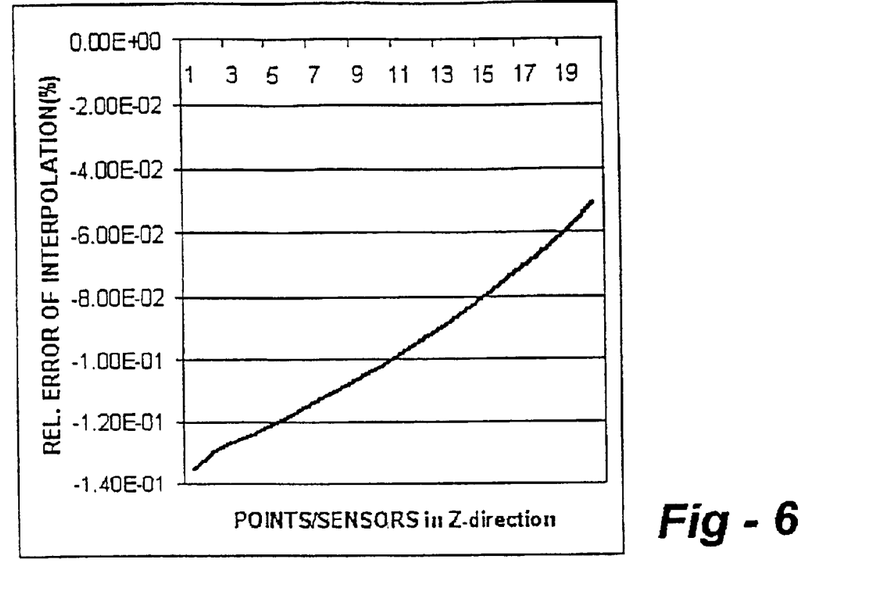
FIG. 6 is a plot indicating relative error of evaluation of potential across a cube 10 inches on a side utilizing linear interpolation of surface data with respect to actual data.

These results show that even linear surface interpolation virtually does not introduce errors. The explanation of this result is that errors of underestimation and errors of overestimation of points compensate one another. Note that the solution for the potential at a given point is simply a linear combination of contributions of the field at all of the surface points.

Implementation Considerations

Figure 7:
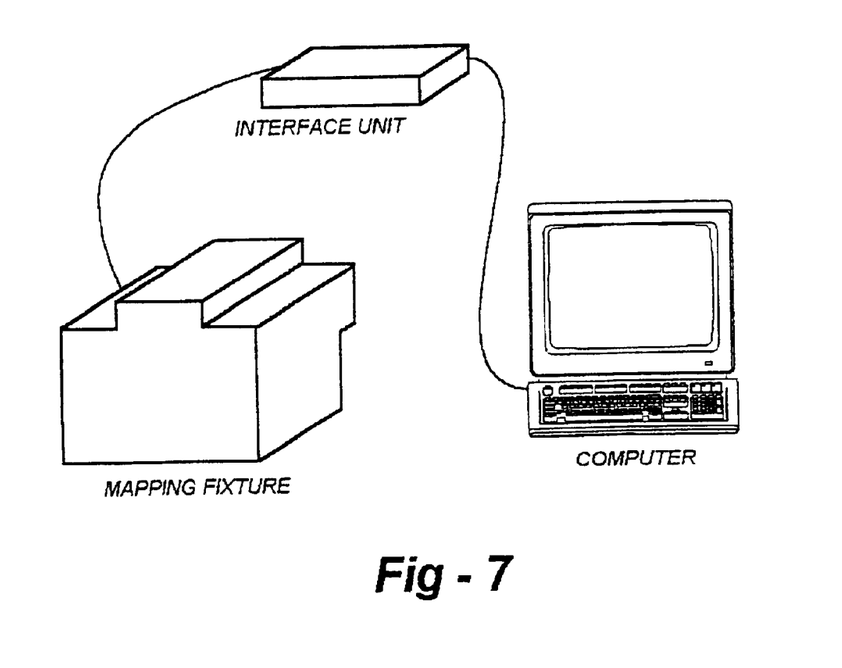
FIG. 7 is the disclosed mapping system consisting of mapping fixture in the form of a hollow frame having a sensor array on its surface, an interface unit synchronized with an on-board tracker and a computer for data analysis, processing and data output.

In the preferred embodiment, a mapper for aircraft applications according to the invention would have no moving parts (FIG. 7). Although a mapper without moving parts could be constructed using existing volume mapping technology by positioning thousands of sensors on a grid, this is believed to be impractical. An important advantage of the inventive method is that only single axis sensors are needed to measure one component of the electromagnetic field, as opposed to existing mappers with three-axis sensors measuring three components of the of magnetic induction vector throughout the interior of the volume. Note that in medical and geophysical applications the interior measurements are simply impossible in many cases.

Figure 8:
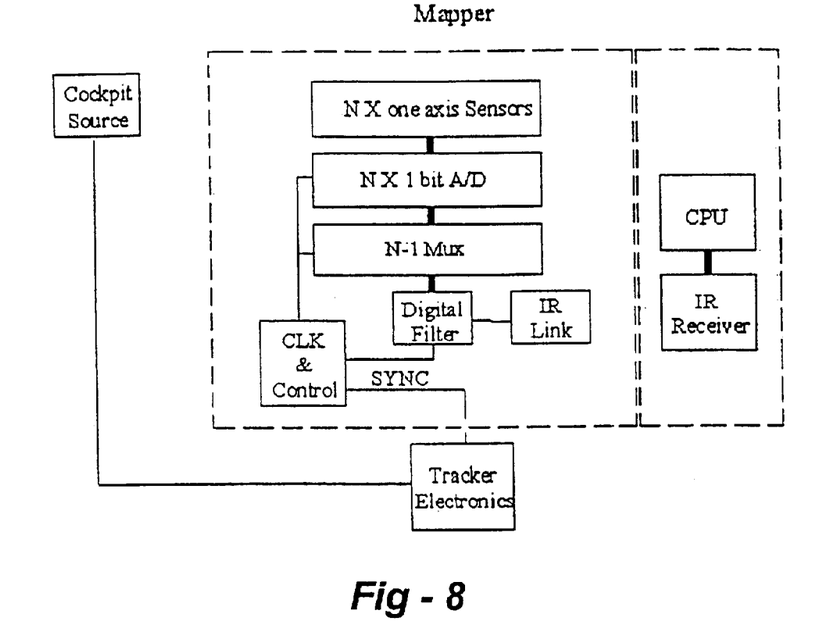
FIG. 8 shows the block-diagram of mapper electronics.
Figure 9:
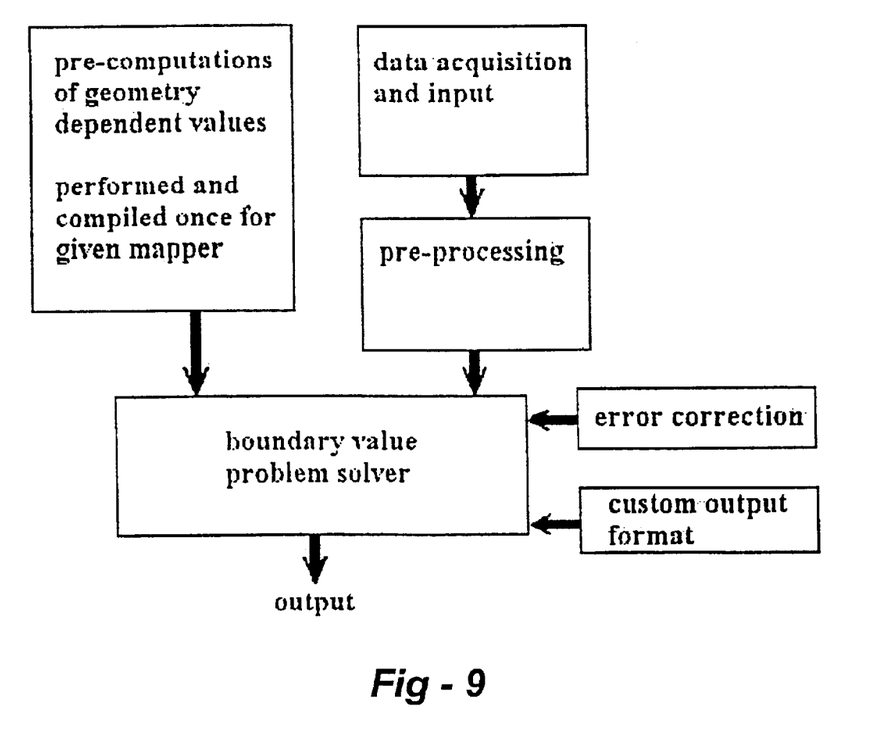
FIG. 9 is a plot which helps to explain a computational algorithm according to the invention.

The block-diagram of the electronic part of the aircraft mapper is presented in FIG. 8. The computational/numerical method described herein was implemented in a Windows 9x/NT-based suite (FIG. 9). The program generator computes an array of Green's functions for a given shape of the motion box. The result is plugged into the second program. The second program performed actual evaluations of the boundary value problem (BVP solver). An output is in the form of scalar potential and components of the vector of magnetic induction for three sources.

Figure 10:
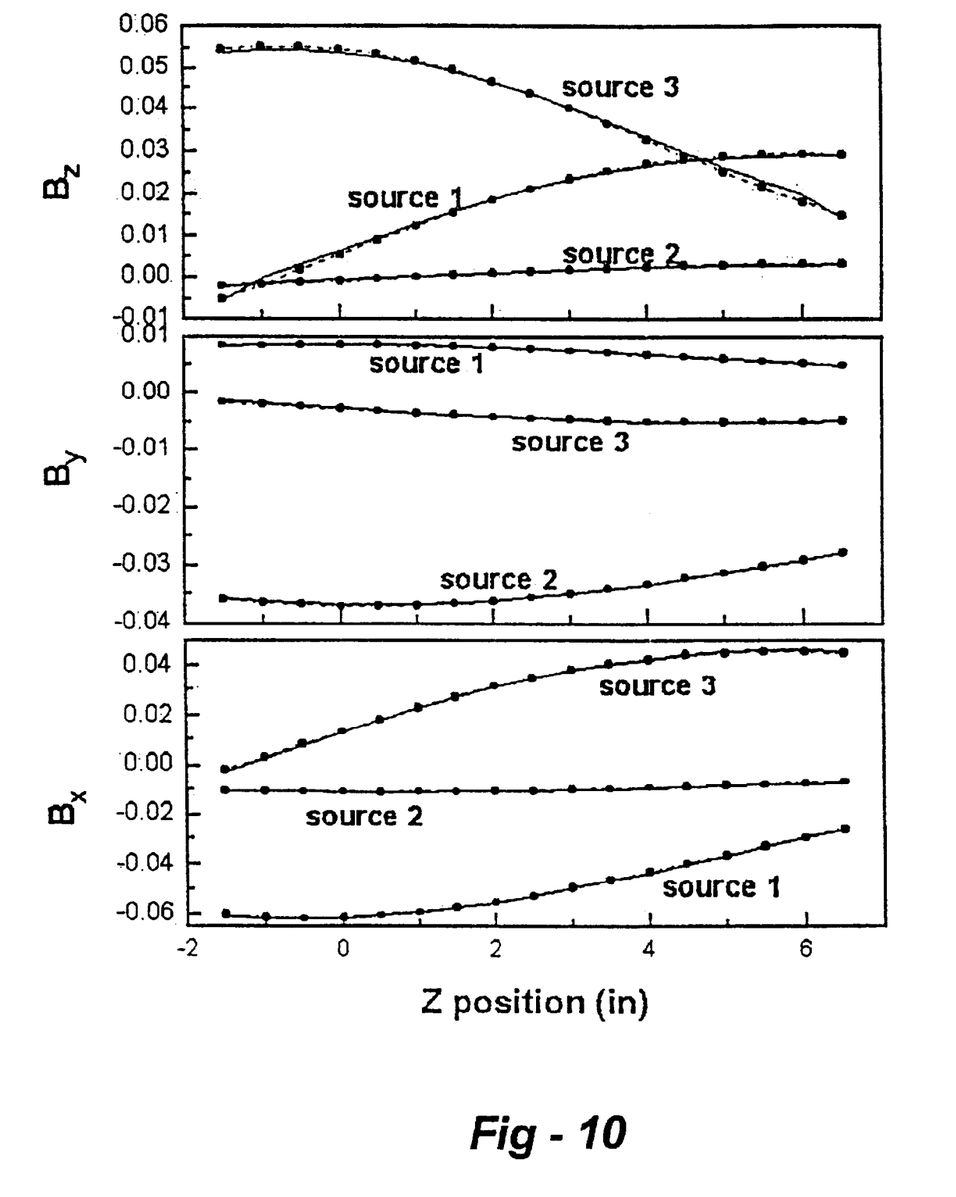
FIG. 10 is a comparison of the components of magnetic induction in the motion box obtained by the disclosed method (solid lines) and currently used method (dotted line with circles) at X=−13", Y=1.5".

As mentioned elsewhere herein, the solution is stable with respect to any zero-mean noise. The acceptable accuracy of experimental results has been achieved. Experimental results in a real environment (1:1 scale model of Apache helicopter cockpit) are presented in FIG. 10. The numerical procedure took 12 sec. to arrive at the BVP solution in a motion box 12×12×8 inches on the grid 25×25×17. Error correction and creation of output files for scalar potential and vector of magnetic induction for 3 sources consumed an additional 11 minutes. The accuracy of evaluation is comparable with or higher than an actual accuracy of field measurement and positioning of existing mappers.

The invention is applicable to numerous commercial products which would benefit from the mapping or finding of an electromagnetic field in a bounded volume. The technique is capable of defining different characteristics of the field such as the intensity of flux, scalar potential, or electromagnetic induction. In addition to electromagnetic tracking systems such as LOS tracking, the methodology is directly applicable to electromagnetic motion capture systems, tomographic systems and devices (including optical, X-ray, magnetic), non-destructive electromagnetic measurements, and remote sensing.

FIG. 2 is a simplified cross-section drawing used to show how the application may be applied to biological and medical situations. In this case, which is applicable to computer-aided tomography, a source 202 of an AC magnetic field, or near infrared radiation derived from, for example, a laser source is used to irradiate an object to determine its internal structure. The example shown in FIG. 2 is that of a human head, though such a technique is directly applicable to any other types of tissue or samples conducive to such non-invasive evaluation. An array of sensors or photodetectors, as appropriate in view of the source of irradiation, are placed onto the surface bounding the volume containing the region of interest, and are used to collect data from the surface, such as the normal to the surface component, as described above.

FIG. 3 illustrates, in a perspective view, an application of the invention to remote sensing, in this case a geophysical data-gathering usage. According to this embodiment, a source of irradiation from a remote location such as an aircraft or other source is directed toward a region of interest. Within this region, assuming the geophysical representation as shown, the sensor array may be placed on the ground, or at other points above or below the ground, as appropriate, so as to define a much larger region of interest as compared to previous examples discussed above. As an alternative, a sensor may be placed on the aircraft or other vehicle, with the data being acquired sequentially or, as a further alternative, the source may be on the ground or on another aircraft, satellite or other form of remote source.

We claim:

1. A method of defining an electromagnetic field within a volume substantially bounded by a surface comprising:
   measuring a surface array value of an essentially normal to the surface component of the field at a plurality of discrete points about the surface;
   computing a three-dimensional array of independent functions of an electromagnetic field operator; and
   operating on the surface array value and the three-dimensional array with the operator to yield parameters of the field within the volume.

2. The method of claim 1, wherein the plurality of discrete points are regularly spaced.

3. The method of claim 1, wherein the plurality of discrete points are irregularly spaced.

4. The method of claim 1, wherein the plurality of discrete points are used to interpolate additional points or to create a set of regular points.

5. The method of claim 1, wherein the plurality of discrete points are irregularly spaced, and interpolation is used to create a set of regular points based upon the irregularly spaced points.

6. The method of claim 1, wherein the step of computing the parameter within the volume of the field can be described by the equation having the general form $$\Im\Phi(r)=0$$

where $\Im$ is a differential operator corresponding to the definition of the field and $\Phi$ is a spatially dependent function of the field within the volume.

7. The method of claim 6, wherein the spatially dependent function of the field $\Phi$ at a point r' on the surface and point r in the volume may be expressed in a general form:

$$\Phi(r) = -\sum_{r'} G(r-r')\frac{\partial\Phi(r')}{\partial\bar{n}}\delta S$$

where G(r–r') is a Green's function, $$\frac{\partial\Phi(r')}{\partial\bar{n}}$$

is the surface array value, and $\delta S$ is a sensor surface area.

8. The method of claim 1, wherein the three-dimensional array of independent functions comprise weight functions.

9. The method of claim 8, wherein the three-dimensional array of independent functions comprise Green's functions.

10. The method of claim 1, wherein the array of functions is computed independently of the measuring of the field surface array value at discrete points on the surface.

11. The method of claim 1, wherein the steps of computing the array of independent functions and operating on the array of functions and the array of values comprise numerical calculations.

12. The method of claim 1, further comprising the step of compensating for error wherein the error $\epsilon$ may be described in a general form:

$$\Im[\Phi(r)-\Phi^*(r)]=-\epsilon$$

where $\Im$ is a differential operator corresponding to the equation describing the field, $\Phi$ is a spatially dependent function of the field within the volume, and $\Phi^*$ is a spatially dependent approximation/computed function of the field within the volume.

13. The method of claim 1, wherein the surface array value is electromagnetic flux density.

14. The method of claim 1, wherein the surface array value is an intensity.

15. The method of claim 1, wherein the surface array value is a derivative of electromagnetic scalar potential.

16. The method of claim 1, wherein the surface array value is a normal component of electromagnetic induction.

17. The method of claim 1 wherein the surface array value is a normal component of electromagnetic flux.

18. The method of claim 1, wherein the volume comprises an arbitrary geometric shape.

19. The method of claim 1, in which the measurements of the field components at discrete points about the surface are made by positioning a plurality of sensors, one at each point.

20. The method of claim 19, wherein the sensor is selected from a group consisting of a photo detector, an induction coil, a scintillation counter, a SQUID detector, a radio antenna, a film recording medium, CCD camera or device, Hall sensor, and flux gate detector.

21. The method of claim 1, in which the measurements of the field components at discrete points in the surface are made by employing a sensor and moving the sensor through the plurality of discrete points.

22. The method of claim 21, wherein the sensor is selected from a group consisting of a photo detector, an induction coil, a scintillation counter, a SQUID detector, a radio antenna, a film recording medium, CCD camera or device, Hall sensor, and flux gate detector.

23. A method of mapping an electromagnetic field within a volume substantially bounded by a surface, comprising:
   measuring a surface array value of an essentially normal to the surface component of the field at a plurality of discrete points about the surface;
   computing a three-dimensional array of independent functions of an electromagnetic field operator;
   operating on the surface array value and the three-dimensional array with the operator to yield a parameter of the field within the volume;
   receiving an electromagnetic signal within the volume; and
   interpreting the signal in accordance with the computed characteristics of the electromagnetic field.

24. The method of claim 23, wherein the electromagnetic signal is related to a physical position.

25. The method of claim 23, wherein the parameter within the volume comprises electromagnetic flux density.

26. The method of claim 23, wherein the parameter within the volume comprises scalar potential.

27. The method of claim 23, wherein the parameter within the volume comprises electromagnetic induction.

28. The method of claim 23, wherein the parameter within the volume comprises electromagnetic intensity.

29. A method of detecting inhomogeneities within a body, comprising:
   irradiating a body with an electromagnetic field;
   measuring a surface array value of an essentially normal to a surface component of the field, the surface at least partially bounding the body, the surface array value being measured at a plurality of discrete points about the surface;
   computing a three-dimensional array of independent functions of an electromagnetic field operator; and
   operating on said surface array value and said three-dimensional array with said operator to map an inhomogeneity within the body.

30. A method of geophysical mapping, comprising:
   measuring a value of an electromagnetic field at a plurality of discrete points defining a surface partially bounding a geophysical volume;
   computing a three-dimensional array of independent functions of an electromagnetic field operator, the three-dimensional array corresponding to the plurality of discrete points about the surface; and
   operating on the surface array value and the three-dimensional array with said operator to a parameter of field with said volume.

31. In a system for measuring the position and orientation of a sensing antenna disposed within a volume at least partially bounded with respect to a surface relative to the position and orientation of a transmitting antenna, wherein the generation of AC electromagnetic fields emanating from the transmitting antenna are received by the sensing antenna and corrected in relation to the detected fields in accordance with a database of the three-dimensional fields existing within the volume prior to energization of the transmitting antenna, the method of creating the database, comprising:
   mapping an electromagnetic field within the volume by measuring a surface array value of an essentially normal to the surface component of the field at a plurality of discrete points arrayed about the surface using one or more sensors;
   computing a three-dimensional array of independent functions of an electromagnetic field operator, the three-dimensional array corresponding to the plurality of discrete points about the surface; and
   operating on the surface array and the three-dimensional array with the operator to yield a parameter of the field within the volume.

32. An apparatus for mapping parameters of an electromagnetic field within a volume at least partially bounded by a surface, comprising:
   at least one electromagnetic sensor adapted to be disposed at a plurality of points about the surface, the sensor being operative to generate values of an essentially normal to the surface component of the electromagnetic field;
   an interface/control unit to acquire data from the sensors;
   a memory adapted to receive and store the signals generated by the at least one sensor representative of the value of the field at the spaced points;
   a computer programmed to receive the output of the memory storing the values and calculate at least one parameter of the electromagnetic field using Green's function on a three-dimensional basis for points within the volume; and
   a second memory for storing the calculated values of the parameter of the three-dimensional field.

33. The apparatus of claim 32, wherein a weight function is used to calculate at least one parameter of the field.

34. The apparatus of claim 32, wherein the volume comprises any arbitrary geometric shape.

35. The apparatus of claim 32, further comprising a computer for correcting for error wherein the error $\epsilon$ may be described in a general form:

$$\Im[\Phi(r)-\Phi^*(r)]=-\epsilon$$

where $\Im$ is a differential operator corresponding to the equation describing the field, $\Phi$ is a spatially dependent function of the field within the volume, and $\Phi^*$ is a spatially dependent approximation function of the field within the volume.

36. The apparatus of claim 32, further comprising means for receiving an electromagnetic signed within the volume and interpreting the signal in accordance with the computed values of the electromagnetic field.

37. The apparatus of claim 36, wherein the electromagnetic signal is related to a physical position.

38. The apparatus of claim 32, wherein electromagnetic flux density is at least one parameter of the field.

39. The apparatus of claim 32, wherein scalar potential is at least one parameter of the field.

40. The apparatus of claim 32, wherein electromagnetic intensity is at least one parameter of the field.

* * * * *